3,038,846
CONTROL ROD ACTUATOR MECHANISM

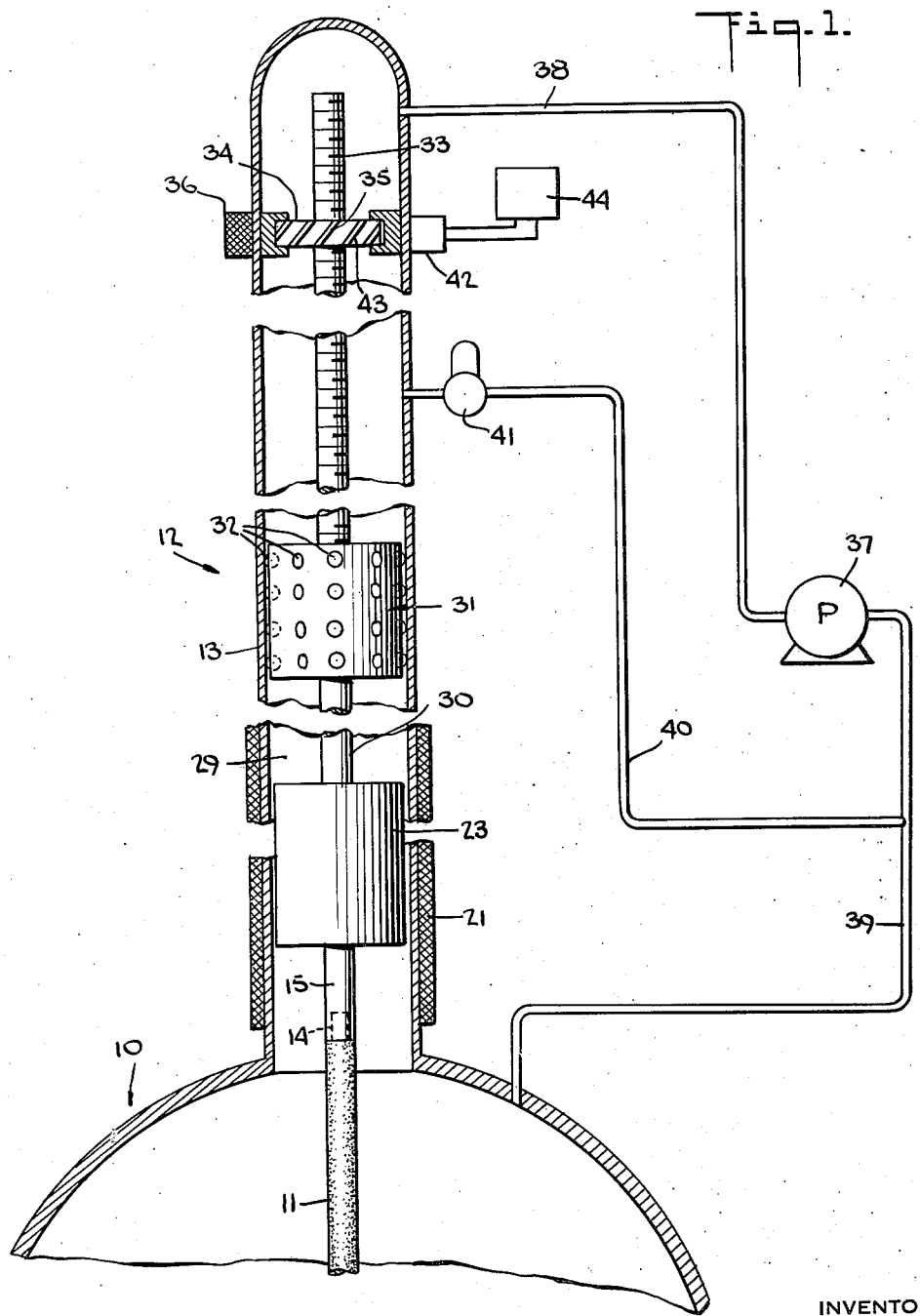

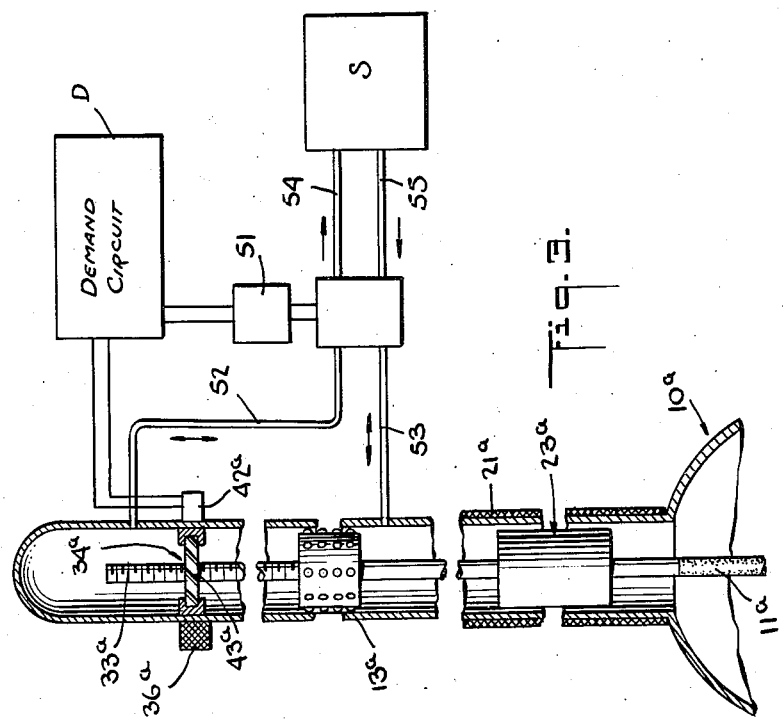
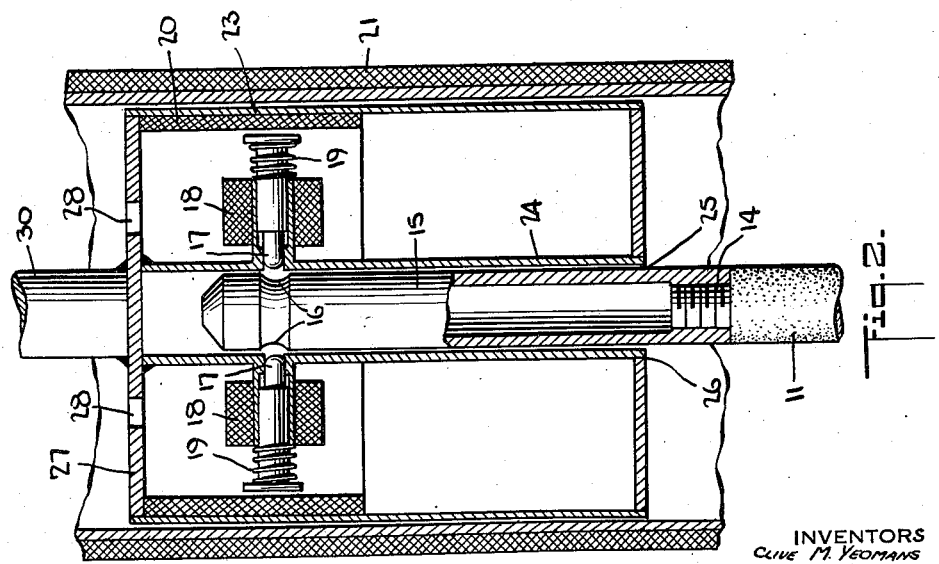

Clive M. Yeomans, Towson, Ralph E. Engberg, Hagerstown, and Walter J. Taylor, Jr., Walbrook, Md., assignors to Martin-Marietta Corporation, a corporation of Maryland
Filed Nov. 7, 1957, Ser. No. 695,003
6 Claims. (Cl. 204—193.2)

This invention relates to pressurized fluid reactors and more particularly to a control rod actuator mechanism therefor which utilizes fluid under pressure derived from the reactor or other suitable sources for its operation.

Fluid pressure reactors require control rods for controlling their operation, the relative depth of insertion of the control rods into the reactor core providing the reactor control. The actuator mechanism for operating the control rods appropriately in response to reactor demand must be sensitive and readily responsive to such demand. In addition, it must be equipped with an emergency or "scram" condition release mechanism to permit very rapid stopping by insertion of the control rods into the reactor when said "scram" condition occurs. In addition, this "scram" release mechanism should be automatic and adapted to function when power fails or is otherwise discontinued to insure utmost safety of reactor operation. Also, space limitations frequently make it difficult to utilize conventional motive power for moving the control rods. Moreover, the pressurized fluid itself may interfere with electrical operation of conventional electric motors because of the need for maintaining some of the contacts or controls or motion producing devices submerged within the fluid.

Objects and features of the present invention are the provision of control rod actuating mechanism with which the foregoing difficulties are overcome.

Further objects and features of the invention are the provision of a fluid pressure operated control rod actuator mechanism capable of utilizing the pressurized reactor fluid or pressurized fluid from other sources for providing its operational power.

Additional objects and features of the invention are the provision of gravity impelled "scram" control rod movement and of a release mechanism for "scram" conditions that operates automatically and is adapted to function when power fails or is otherwise discontinued during reactor operation to insure utmost safety.

Still other objects and features of the invention are the provision of a control rod actuator mechanism that is effective and readily installed in new or existing reactors.

Other objects and features of the invention will become apparent from the following specification and the accompanying drawings, wherein:

FIGURE 1 is a longitudinal section of a control rod actuator mechanism and associated parts in position of use on a reactor;

FIGURE 2 is a diagrammatic showing of latching means for releasing the control rod for "scram" action; and FIGURE 3 is a view similar to FIGURE 1 of a modified construction.

Referring to the drawing and first to FIGURE 1, the reference character 10 denotes a portion of the housing of a pressurized water nuclear reactor. Vertically movable control rods 11 (only one of which is shown) serve to control the power output of the reactor. The relative depths of insertion of such control rods regulate the reactor power output. An actuator mechanism denoted generally by the reference character 12 and positioned on the dome of the reactor housing 10 serves to control the vertical position of each control rod.

The actuator mechanism 12 comprises a vertical tubular body 13 of non-magnetic material, extending outwardly of the dome of the reactor housing 10 and in alignment with the axis of movement of the control rod 11, said tube being open at its inner end and sealed at its upper or outer end. The inner end of tube 13 is sealed to the dome of the reactor housing 10 in conventional ways.

The upper end of the control rod 11 is secured as by threaded engagement at 14 (FIGURE 2) to a tubular extension 15. Detents 16 are provided in the wall of the extension 15 into which laterally movable pawls 17 may be engaged for latching purposes. The pawls 17 comprise movable armatures for solenoid coils 18, and are drawn into the latter and into detent engaging position against the biasing action of light springs 19 whenever the coils 18 are electrically energized via a secondary coil 20 to which they are connected. The secondary coil 20 receives its energy through electromagnetic coupling with a primary coil 21 surrounding the tube 13. The pawls, solenoids and springs are positioned and supported within a cylindrical container 23 which is movable axially within the tube 13 in the region thereof which is surrounded by the primary coil 21.

The tubular extension 15 is movable longitudinally within a guide sleeve 24 in the container 23 and extends into it through an opening 25 in the lower end 26 of the sleeve. The upper end 27 of container 23 has openings 28 which communicate with the space 29 within tube 13 for purposes presently to be described.

An axially aligned rod 30 is secured to the upper end 27 of the container and a piston 31 is secured to the rod 30. This piston 31 is dimensioned to provide limited clearance of selected dimensions between its periphery and the inner wall of the tube 13. For example, this piston 31 is centered in the tube 12 by rotatably embedded balls 32 so that it may move freely in an axial direction within the said tube.

A threaded rod 33 extends axially from piston 31 and threadedly engages a rotatable positioning wheel 34. The wheel 34 has vane-like spokes 35 so that flow of fluid through spaces between the spokes will rotate said wheel which, however, is restrained from longitudinal or axial movement within tube 13 in any conventional way.

A magnetic brake 36 positioned adjacent to wheel 34 serves to permit or to prevent rotation of wheel 34 as required for purposes presently to be described.

A pump 37 is connected by conduit 38 with the interior of the tube 13 above the wheel 34 and by a conduit 39 with the interior of the reactor housing 10. A branch or by-pass conduit 40 is connected with the interior of tube 13 below the wheel 34 and with the conduit 39. A solenoid operated control valve 41 is operable electrically to open and close the by-pass conduit 40 as conditions may require.

In operation, the pump 37 is energized causing it to withdraw fluid from the space in tube 13 above wheel 34 via conduit 38 and recirculate it to the reactor via conduit 39, by-pass control valve 41 being closed at this time. The rate of flow is that normally required to balance the weight of the control rod 11 and the parts above described which are connected thereto so that the rod is held at a desired position of insertion within the reactor housing. The clearance between the piston 31 and the inside diameter of the pressure tube 13 is predetermined to cause a pressure differential in the zones of tube 13 above and below the piston tending to cause the piston 31 to rise and also to tend to cause fluid to flow upwardly through vaned wheel 34 thereby rotating the latter when the magnetic brake 36 is deenergized. In consequence, with the brake 36 in release position, the wheel 34 will rotate to move screw 33 upwardly, elevating the piston 31, and the control rod 11 which at this time is latched by pawls 17 which engage detents 16 of tubular extension 15 because electric energy is supplied to primary coil 21.

If at any time during this elevating movement of the control rod 11, an emergency or "scram" condition occures, or electric power failure occurs, the primary coil 21 is immediately deenergized whether by a manual or automatic monitor switch (not shown), or by the fact that power failure has occurred. As a result, the solenoids 18 are deenergized and springs 19 act immediately to withdraw pawls 17 from engagement with detents 16. This disengages member 15 and control rod 11 then falls freely into fully inserted or reactor stopping position due to gravitational force. Such "scram" releases of the control rod 11 may be effected whenever the necessity therefor arises, and, being entirely free of any need for power, is entirely independent of any power failures that may occur thus insuring maximum safety of reactor operation.

In order to lower the control rod from an elevated position to a required lower one and also to reengage the control rod by the latching mechanism if a "scram" release has occurred, the piston 31 must be moved downwardly. Such downward motion is effected by opening the solenoid controlled by-pass valve 41 thus reducing the sustaining pressure on the piston 31, and reversing pump 37 thereby reversing direction of flow of fluid through the vanes of wheel 34 causing it to rotate in reverse direction if its magnetic brake 36 is deenergized. As a result, the threaded rod 33 is moved downwardly, lowering the piston 31 as well as the control rod 11 and attached parts.

If at any time during upward or downward motion of the control rod 11 as above described, a "scram" release has occurred, the rod 11 of course has fallen to its fully inserted position within the reactor. It is necessary then to lower the piston 31 fully for effective re-engagement of the latches or pawls 17 in the detents 16.

Manual or automatic monitoring of electric power supply to the pump drive as well as the electric magnetic brake 36 and the solenoid valve 41 in conventional electrical systems can be utilized to provide necessary elevation and lowering of the control rod 11 to satisfy required reactor functioning during use.

Detection of the elevational position of the control rod may be obtained in various ways. For example, a transducer 42 cooperating with the positioning wheel 34 may be located on tube 13 adjacent the wheel. This transducer 42 is intended to cooperate with a determined number of the magnetic elements 43 on the surface of the wheel. Increments of movement of said wheel will then be detected by the number of these elements 43 which pass the transducer during rotation of the wheel 34 because the passage of each element 43 will be detected by the transducer 42. The latter can be connected in conventional ways to a counter 44 or to a similar device to register the vertical movement of control rod 11 and its vertical position. As an alternative, the threaded rod 33 may serve to indicate the position of the control rod by operating electrical contacts (not shown) or inductively by affecting coils (not shown) positioned about tube 13 in the zone of movement of the rod 33, so that the translation of the rod 33 and hence of the control rod 11 will be converted into a proportional electrical signal readable on an appropriately calibrated meter (not shown).

In the system described, the pressure of the fluid within the reactor itself is utilized to provide operational force for elevating or lowering the piston 31 and consequently the control rod 11 associated with it. Thus the provision of external moving mechanisms is eliminated.

An alternative hydraulic control system is illustrated in FIGURE 3. Herein a four-way servo-valve 50 controlled by a servo-motor 51 is utilized instead of the pump 37, conduits 38, 39 and 40 and solenoid controlled valve 41 of FIGURE 1. The servo-valve 50 is connected by conduits 52 and 53 to the extension tube 13a at opposite sides of piston 31a, and by conduits 54 and 55 to a fluid pressure source S which may be that supplying the reactor pressure fluid for one or more reactors. The servo-valve 50 serves to control direction of fluid flow from the source S above and below the piston 31a and wheel 34a so that appropriate directional rotation may be imparted to the latter for raising or lowering piston 31a by proper directional fluid flow through the released vane wheel 34a. The other mechanism included and bearing subscripts "a" within tube 13a are identical with correspondingly numbered parts in FIGURES 1 and 2. The servo-motor 51 is connected in a demand circuit D responsive to demand signals from the reactor to operate the valve 50 in appropriate direction as required. A feed back signal generated by the magnetic elements 43a on the positioning wheel 34a in the transducer 42a and feeding into the demand circuit D serves to monitor the operation of the servo-motor 51 and to maintain the piston 31a and control rod 11a at desired reactor demand position.

The "scram" release mechanism within container 23a is identical with that within container 23 and operates identically. As with the first modification, occurrence of a "scram" condition, or power failure at any time causes immediate unlatching and release of the control rod 11a as hereinabove described regarding FIGURES 1 and 2 for free fall to fully inserted reactor position to meet the emergency and provide safe reactor operation.

It is to be understood that the particular latch release mechanisms described are merely intended as illustrative. They may be replaced by any other similarly functioning release mechanisms.

While specific embodiments of the invention have been desecribed and shown, variations in structural detail within the scope of the appended claims are possible and are contemplated. There is no intention, therefore, of limitation to the exact features hereinabove presented.

What is claimed is:

1. An actuator mechanism for a pressurized fluid nuclear reactor comprising a housing secured to the top exterior of the pressure vessel of a pressurized fluid nuclear reactor with the interior of said housing communicating with the interior of said pressure vessel, a piston member movable reciprocally in said housing in a vertical direction and dimensioned to provide limited clearance between its periphery and said housing for passage of fluid, a vaned member fixed in said housing above said piston member and rotatable about a vertical axis in a direction determined by the direction of fluid flow through its vanes, an elongated vertical member threadedly engaged by said vaned member and secured to said piston member, said elongated member being movable vertically on rotation of said vaned member, a control rod coupled to said piston member for movement in said pressure vessel corresponding to the movement of said elongated member, first and second conduit means connected to said housing above said vaned member and below said vaned member, respectively, for circulating fluid through said vaned member to effect rotation thereof.

2. The mechanism of claim 1 including a source of fluid pressure, a four way servo-control valve connected to said source and to said first and second conduit means for controlling the direction of fluid flow in said conduit means, and a servo-motor for operating said control valve.

3. The mechanism of claim 1 wherein said second conduit means connected to said housing is also connected to said pressure vessel, and including pump means in series connection respectively between said first conduit means and said second conduit means and valving means for said second conduit means.

4. The mechanism of claim 1 including emergency release mechanism for selectively coupling said control rod and said piston member.

5. The mechanism of claim 1 including clutch means for stopping and freeing said vaned member for rotation.

6. The mechanism of claim 1 including position detecting means for determining the location of the control rod.

References Cited in the file of this patent

UNITED STATES PATENTS 1,993,612     Lum _____ Mar. 5, 1935

OTHER REFERENCES

Schultz: Control of Nuclear Reactors and Power Plants, McGraw-Hill Book Co., New York, 1955, pages 105, 110–115, 119–120, 274.